US012420566B2

(12) United States Patent
Aizawa

(10) Patent No.: US 12,420,566 B2

(45) Date of Patent: Sep. 23, 2025

(54) DIELECTRIC HEATING DEVICE AND LIQUID EJECTION SYSTEM

(71) Applicant: SEIKO EPSON CORPORATION, Tokyo (JP)

(72) Inventor: Tadashi Aizawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 266 days.

(21) Appl. No.: 18/342,762

(22) Filed: Jun. 28, 2023

(65) Prior Publication Data

US 2024/0001691 A1 Jan. 4, 2024

(30) Foreign Application Priority Data

Jun. 30, 2022 (JP) ................................ 2022-105371

(51) Int. Cl.

*B41J 11/00* (2006.01)
*H05B 6/48* (2006.01)
*H05B 6/52* (2006.01)
*H05B 6/54* (2006.01)

(52) U.S. Cl.

CPC ........ *B41J 11/0021* (2021.01); *B41J 11/0024* (2021.01); *H05B 6/48* (2013.01); *H05B 6/52* (2013.01); *H05B 6/54* (2013.01)

(58) Field of Classification Search

CPC ... B41J 11/0024; B41J 11/002; B41J 11/0021; B41M 7/0072; B41M 7/0081; B41M 7/009; H05B 6/46; H05B 6/48; H05B 6/54; H05B 6/62; H05B 1/00; H05B 3/0004

USPC .......................................................... 347/102

See application file for complete search history.

(56) References Cited

U.S. PATENT DOCUMENTS 11,135,856 B2 * 10/2021 Aizawa .............. B41J 11/00216
2016/0338154 A1 * 11/2016 Inoue et al. ............. H05B 6/62

FOREIGN PATENT DOCUMENTS

JP 2018-009754 A 1/2018

* cited by examiner

*Primary Examiner* — Leslie J Evanisko
*Assistant Examiner* — Thomas Ray Knief
(74) *Attorney, Agent, or Firm* — Global IP Counselors, LLP

(57) ABSTRACT

A dielectric heating device includes a first heater, configured to heat and dry the liquid, having first electrode and the second electrode facing a medium on which is deposited a liquid containing water, and a first coil electrically coupled in series with the first electrode, and a voltage application section that applies an AC voltage having a predetermined driving frequency to the first electrode and the second electrode. The first heater is configured such that a difference between a resonant frequency of the first heater and the driving frequency when the water content of the medium is in a first range is smaller than the difference between the resonant frequency of the first heater and the driving frequency when the water content is in a second range smaller than the first range, and a heat amount, when the water content is in the first range, is larger than a heat amount, when the water content is in the second range.

6 Claims, 8 Drawing Sheets

DIELECTRIC HEATING DEVICE AND LIQUID EJECTION SYSTEM

The present application is based on, and claims priority from JP Application Serial Number 2022-105371, filed Jun. 30, 2022, the disclosure of which is hereby incorporated by reference herein in its entirety.

BACKGROUND

1. Technical Field

The present disclosure relates to a dielectric heating device and a liquid ejection system.

2. Related Art

Regarding dielectric heating devices, JP-A-2018-9754 discloses a technology in which the water content of a transported object is measured by sensors, and power of a high-frequency electric field applied to electrodes provided at positions corresponding to the sensors is individually controlled in accordance with each measurement result. With this technique, the transported object can be uniformly dried.

However, according to the technology of JP-A-2018-9754, in order to control the power of the high-frequency electric field applied to the electrodes, it is necessary to provide sensors for measuring the moisture content of the conveyed object.

SUMMARY

According to a first aspect of the present disclosure, a dielectric heating device is provided. This dielectric heating device includes a first heater, configured to heat and dry the liquid, having a first electrode and a second electrode facing a medium on which is deposited a liquid containing water, and a first coil electrically coupled in series with the first electrode, and a voltage application section that applies an AC voltage having a predetermined driving frequency to the first electrode and to the second electrode. The first heater is configured such that a difference between a resonant frequency of the first heater and the driving frequency when the water content of the medium is in a first range is smaller than the difference between the resonant frequency of the first heater and the driving frequency when the water content is in a second range smaller than the first range, and a heat amount, when the water content is in the first range, is larger than a heat amount, when the water content is in the second range.

According to a second aspect of the present disclosure, a liquid ejection system is provided. A liquid ejection system includes the dielectric heating device according to the aspect described above, and a liquid ejection section configured to eject and apply the liquid to the medium, wherein the first heater heats the medium to which the liquid has been applied by the liquid ejection section.

DESCRIPTION OF EMBODIMENTS

A. First Embodiment

Figure 1:
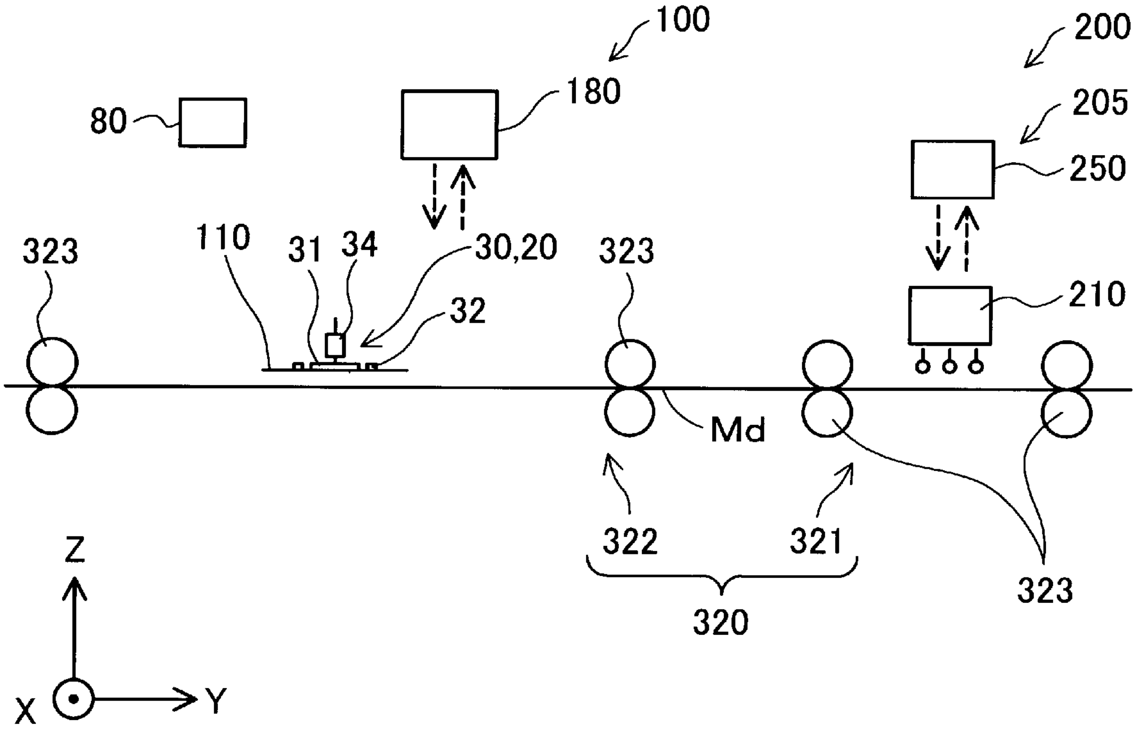
FIG. 1 is a schematic diagram illustrating schematic configuration of a liquid ejection system.

FIG. 1 is a schematic diagram illustrating schematic configuration of a liquid ejection system 200 as a first embodiment. In FIG. 1, arrows indicating X, Y, and Z directions perpendicular to each other are shown. The X direction and the Y direction are directions parallel to a horizontal plane, and the Z direction is a direction along a vertically upward direction. The arrows indicating the X, Y, and Z directions are appropriately illustrated in other drawings such that the illustrated directions correspond to FIG. 1. In the following description, when specifying a direction, a direction indicated by an arrow in each drawing is referred to as "+" and a direction opposite thereto is referred to as "−", and both positive and negative signs are used in the direction notation. Hereinafter, the +Z direction is also referred to as "upward" and the −Z direction is also referred to as "downward". In this specification, the term "orthogonal" includes a range of 90°±10°.

The liquid ejection system 200 includes a dielectric heating device 100 having a heater 20, a liquid ejection apparatus 205, and a transport section 320. The liquid ejection system 200, according to the present embodiment, discharges and applies a liquid containing water to the medium Md by the liquid ejection apparatus 205 while transporting the medium Md by the transport section 320, and heats and dries the liquid applied to the medium Md by the heater 20 of the dielectric heating device 100. It can also be said that the liquid ejection apparatus 205 applies the liquid to be heated by the heater 20 onto the medium Md.

As the medium Md, for example, paper, fabric, film, or the like is used. The fabric used as the medium Md is formed by weaving, for example, fibers such as cotton, hemp, polyester, silk, rayon, or the like, or mixed fibers thereof. In the present embodiment, a sheet-like cotton fabric is used as the medium Md. As the liquid applied to the medium Md, for example, various kinds of inks mainly composed of water are used. In the present embodiment, an aqueous ink containing water as a main component is used as the liquid. In the present specification, the main component of the liquid refers to a substance having a mass fraction of 50% or more among substances contained in the liquid. In another embodiment, any liquid other than ink may be used as the liquid, for example, various coloring materials, electrode materials, samples such as biological organic substances and inorganic substances, lubricating oil, resin liquid, etching liquid, and the like.

The transport section 320 transports the medium Md. In the present embodiment, the transport section 320 is configured as a roller mechanism that transports the medium Md by driving a roller 323. The transport section 320 includes a first transport section 321 provided in the liquid ejection apparatus 205 and a second transport section 322 provided in the dielectric heating device 100. Each of the first transport section 321 and the second transport section 322 includes a roller 323 and a driving unit (not illustrated) configured by a motor or the like for driving the roller 323. The first transport section 321 is disposed at a position in the +Y direction of the second transport section 322. In this embodiment, the first transport section 321 and the second transport section 322 transport the sheet-like medium Md in the —Y direction. In another embodiment, the transport section 320 may be configured as a belt mechanism that transports the medium Md by driving a belt, for example.

In the present embodiment, the liquid ejection apparatus 205 is configured as an inkjet printer that performs printing by ejecting and applying ink as a liquid to a medium Md. Therefore, it can be said that the liquid ejection system 200 is configured as a printing system including an inkjet printer. The liquid ejection apparatus 205 includes a liquid ejection section 210 for ejecting and applying a liquid onto a medium Md, and a first control section 250. Hereinafter, the first control section 250 is also simply referred to as a control section.

The liquid ejection section 210 is configured as, for example, a piezoelectric or thermal liquid ejection head, and includes one or more head chips (not illustrated). Each head chip has a flow channel through which liquid flows and a nozzle for ejecting the liquid. The color of the ink ejected from each head chip may be the same or may be different. In addition, the liquid ejection section 210 may be configured to be capable of reciprocating in a direction perpendicular to the Z direction and intersecting with the Y direction with respect to the medium Md by a carriage (not illustrated), or may be configured as a so-called line head whose position is fixed without reciprocating with respect to the medium Md.

The ink used as the liquid in the present embodiment is pigment ink containing a resin. The resin contained in the ink has an action of firmly fixing the pigment on the medium Md via the resin itself. Such a resin is used, for example, in a state in which a resin that is slightly soluble or insoluble in a solvent such as water is made into fine particles and dispersed in a solvent, that is, in an emulsion state or a suspension state. Examples of such resins include acrylic resin; styrene acrylic resin; fluorene resin; urethane resin; polyolefin resin; rosin modified resin; terpene resin; polyester resin; polyamide resin; epoxy resin; vinyl chloride resin; vinyl chloride-vinyl acetate copolymer, ethylene-vinyl acetate resin, and the like. Two or more of these resins may be used in combination.

The first control section 250 is configured by a computer including one or a plurality of processors, a storage device, and an input/output interface that performs input and output of signals with the outside. In this embodiment, the first control section 250 controls the liquid ejection section 210 and the second transport section 322 to eject and deposit the liquid to the medium Md while transporting the medium Md. In another embodiment, the first control section 250 may be configured by a combination of a plurality of circuits.

Figure 2:
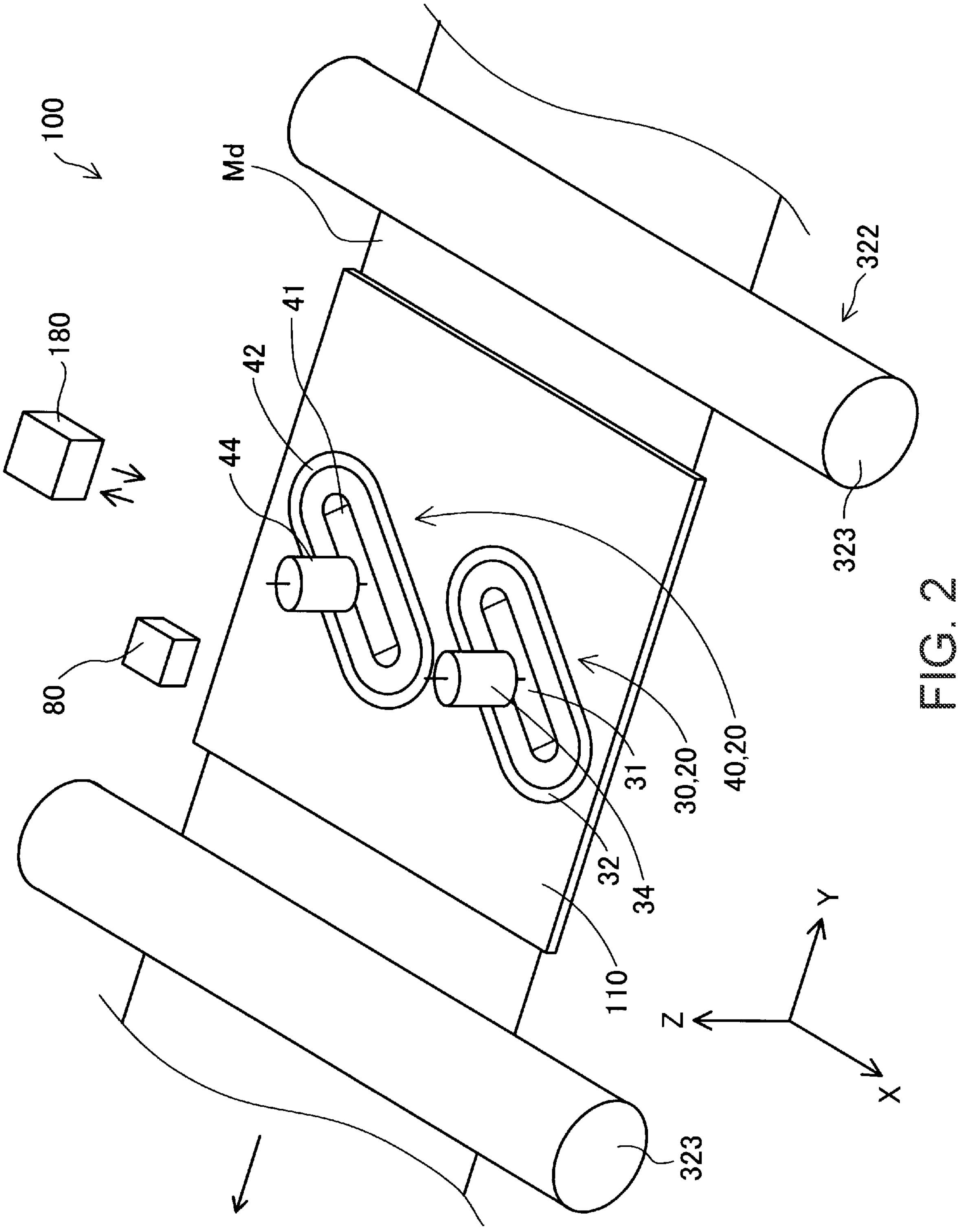
FIG. 2 is a perspective view illustrating schematic configuration of the dielectric heating device.

FIG. 2 is a perspective view illustrating schematic configuration of the dielectric heating device 100 according to the first embodiment. As shown in FIGS. 1 and 2, the dielectric heating device 100 includes the heater 20 that heats and dries the liquid applied to the medium Md, a voltage application section 80 that applies an AC voltage to the heater 20, and a second control section 180. The dielectric heating device 100 according to the present embodiment dries the liquid deposited on the medium Md by heating the liquid deposited on the medium Md with the AC electric field generated from the heater 20 while transporting the medium Md by the second transport section 322. The dielectric heating device 100 may be provided with, for example, a blower or the like for generating an airflow. By providing such a blower, it is possible to promote drying of the liquid deposited on the medium Md and to promote cooling of the medium Md after completion of drying.

As shown in FIG. 2, the dielectric heating device 100 according to the present embodiment includes a first heater 30 and a second heater 40 as the heater 20. The first heater 30 has a first electrode 31, a second electrode 32, and a first coil 34. The second heater 40 includes a third electrode 41, a fourth electrode 42, and a second coil 44. Hereinafter, the first heater 30 and the second heater 40 may be simply referred to as the heater 20 without distinguishing between them.

The first electrode 31 and the second electrode 32 face the medium Md. The third electrode 41 and the fourth electrode 42 also face the medium Md. In the embodiment, the first electrode 31 and the second electrode 32, and the third electrode 41 and the fourth electrode 42 face the medium Md, which is transported in a first direction, from the second direction, which is perpendicular to the first direction. In this embodiment, the first direction is the −Y direction. The second direction is a direction including both a direction on one side along the same axis and a direction opposite thereto, and is the Z direction in the present embodiment. In other words, in this embodiment, the first electrode 31 and the second electrode 32, and the third electrode 41 and the fourth electrode 42 face, in the Z direction, the medium Md that is transported in the −Y direction by the second transport section 322.

In the present embodiment, the first heater 30 and the second heater 40 are arranged side by side along a third direction. The third direction is a direction that is orthogonal to the first direction and that intersects the second direction. The third direction is a direction including both a direction on one side along the same axis and a direction opposite thereto, and is the X direction in the present embodiment.

The voltage application section 80 is electrically coupled to the first heater 30, and applies AC voltage having a predetermined driving frequency $f_0$ to the first electrode 31 and the second electrode 32. In the present embodiment, the voltage application section 80 is electrically coupled to the second heater 40, and applies AC voltage having the driving frequency $f_0$ to the third electrode 41 and the fourth electrode 42. In the present embodiment, the first heater 30 and the second heater 40 are electrically coupled to each other in parallel. One of the electric potentials applied to the first electrode 31 and the second electrode 32 and one of the electric potentials applied to the third electrode 41 and the fourth electrode 42 may be a reference electric potential. The reference electric potential is a constant electric potential that is a reference of the high-frequency voltage, and is, for example, a ground potential.

In the present embodiment, a high-frequency voltage is applied to each electrode of each heater 20. In this specification, the term "high frequency" refers to a frequency of 1 MHz or more. More specifically, in the present embodiment, 13.56 MHz, which is one of the Industrial Scientific and Medical Bands (ISM-bands), is used as the driving frequency $f_0$. Since the dielectric loss tangent of water becomes maximum near 20 GHz, the liquid deposited on the medium Md can be heated more efficiently by applying a high-frequency voltage of 2.45 GHz or 5.8 GHz of the ISM bands, to each electrode of each heater 20. On the other hand, from the viewpoint of heating ink, even when the driving frequency $f_0$ is relatively low, for example, 13.56 MHz or 40.68 MHz, it is possible to obtain good heating efficiency. This is because when the driving frequency $f_0$ is 13.56 MHz or 40.68 MHz, although the dielectric loss tangent of water in the ink is low, Joule's heat that causes dye components or the like in the ink to become electric resistance is likely to occur.

Like the first control section 250 described above, the second control section 180 is configured by a computer. In this embodiment, the second control section 180 controls the above-described second transport section 322.

Figure 3:
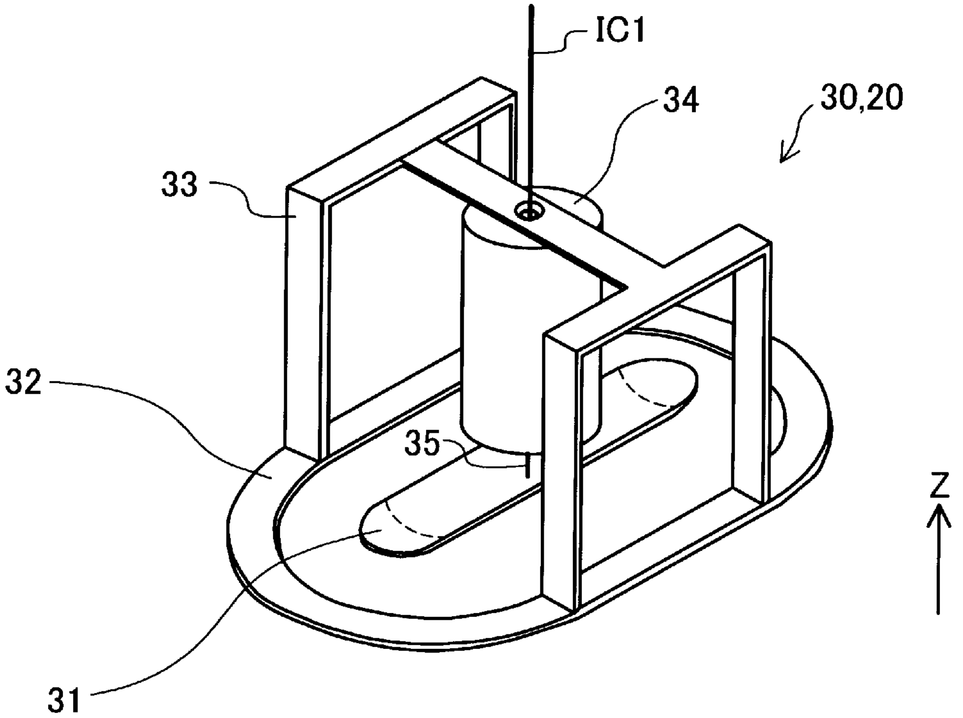
FIG. 3 is a perspective view showing schematic configuration of the heater.

FIG. 3 is a perspective view showing schematic configuration of the heater 20 in the present embodiment. More specifically, FIG. 3 shows schematic configuration of the first heater 30. As described above, the first heater 30 includes the first electrode 31, the second electrode 32, and the first coil 34. Although not shown, in the present embodiment, the third electrode 41, the fourth electrode 42, and the second coil 44 of the second heater 40 described above have the same configurations as the first electrode 31, the second electrode 32, and the first coil 34, respectively.

The first electrode 31 and the second electrode 32 are conductors, and are formed of, for example, a metal, an alloy, a conductive oxide, or the like. The first electrode 31 and the second electrode 32 may be formed from the same or different materials. The first electrode 31 and the second electrode 32 may be disposed on a circuit board or the like formed of a material having low dielectric loss tangent and low conductivity, or may be supported by another member, for example, for the purpose of maintaining the posture and strength thereof.

The first electrode 31 and the second electrode 32 are disposed such that the shortest distance between the first electrode 31 and the second electrode 32 is equal to or less than one-tenth of the wavelength of the electromagnetic field output from the first heater 30. The first electrode 31 in the present embodiment has a boat shape having a longitudinal direction and a lateral direction. The bottom surface of the first electrode 31 has a curved surface shape convex in the −Z direction. The first electrode 31 has an oblong shape when viewed along the Z direction. The second electrode 32 has an oblong ring shape that is flat in the X and Y directions. The second electrode 32 is disposed so as to surround the periphery of the first electrode 31 when viewed along the Z direction. The first electrode 31 and the second electrode 32 are arranged such that the longitudinal direction of the first electrode 31 and the longitudinal direction of the second electrode 32 are parallel to each other.

As shown in FIGS. 1 and 2, both the first electrode 31 and the second electrode 32 are arranged on a circuit board 110 arranged parallel to the X direction and the Y direction. More specifically, the first electrode 31 is disposed such that a central portion in the X direction and the Y direction of the bottom surface of the first electrode 31 is in contact with the top surface of the circuit board 110. The second electrode 32 is arranged such that the bottom surface of the second electrode 32 is in contact with the top surface of the circuit board 110. Therefore, in the present embodiment, the central portion of the bottom surface of the first electrode 31 and the bottom surface of the second electrode 32 are disposed on the same plane. In the present embodiment, the circuit board 110 is provided commonly to the first heater 30 and the second heater 40.

As shown in FIG. 1, in the present embodiment, the first electrode 31 and the second electrode 32 are disposed above the medium Md. Therefore, in the present embodiment, the bottom surfaces of the first electrode 31 and the second electrode 32 face the upper surface of the medium Md. The above-described circuit board 110 is disposed between the medium Md and the first electrode 31 and the second electrode 32. Similarly, the third electrode 41 and the fourth electrode 42 are disposed above the medium Md so as to face the medium Md in the Z direction.

In the present embodiment, the circuit board 110 is formed of glass. The circuit board 110 suppresses the adhesion of liquid, such as ink that was applied to the medium Md, to the first electrode 31 and the second electrode 32, and the adhesion of fuzz from the medium Md to the first electrode 31 and the second electrode 32 when the medium Md is cloth. In the present embodiment, the circuit board 110 also suppresses the adhesion of liquid and fuzz to the third electrode 41 and the fourth electrode 42 of the second heater 40 in the same manner as described above. In other embodiments, the circuit board 110 may be formed of, for example, alumina.

The description will be returned to FIG. 3. In this embodiment, the first electrode 31 is electrically coupled to the voltage application section 80 via a first electric wire 35, the first coil 34, and the inner conductor IC1 of the coaxial cable. The second electrode 32 is electrically coupled to the voltage application section 80 via a coupling member 33 disposed on the second electrode 32, an outer conductor of a coaxial cable (not shown), or the like.

When the AC voltage having the driving frequency $f_0$ is applied to the first electrode 31 and the second electrode 32, an electromagnetic field having wavelengths according to the driving frequency $f_0$ is generated from the first electrode 31 and the second electrode 32. The intensity of the electromagnetic field is very strong near the first electrode 31 and the second electrode 32, and is very weak far from the first electrode 31 and the second electrode 32. In the present specification, an electromagnetic field generated near the first electrode 31 and the second electrode 32 by the application of an AC voltage is also referred to as a "near electromagnetic field". "Near" the first electrode 31 and the second electrode 32 refers to a range in which the distance from the first electrode 31 and the second electrode 32 is equal to or less than $1/2\pi$ of the wavelength of the generated electromagnetic field. A range farther than "near" is also referred to as "far". In the present specification, an electromagnetic field generated far from the first electrode 31 and the second electrode 32 by the application of an AC voltage is also referred to as a "far electromagnetic field". The far electromagnetic field corresponds to an electromagnetic field used for communication by a general communication antenna or the like.

As described above, the first electrode 31 and the second electrode 32 are arranged such that the shortest distance between them is one-tenth or less of the wavelength of the electromagnetic field. Accordingly, the density of the electromagnetic field generated from the first electrode 31 and the second electrode 32 can be attenuated in the vicinity of the first electrode 31 and the second electrode 32. Therefore, by appropriately keeping the distance between the medium Md and the first electrode 31 and the distance between the medium Md and the second electrode 32, it is possible to suppress far electromagnetic field radiation from the first electrode 31 and the second electrode 32 while efficiently heating the liquid deposited on the medium Md by an electric field generated near the first electrode 31 and the second electrode 32. In particular, in the present embodiment, since the second electrode 32 is disposed so as to surround the first electrode 31 when viewed along the Z direction, far electromagnetic field radiation from the first electrode 31 and the second electrode 32 can be further suppressed.

In the present embodiment, one end of the first coil 34 is electrically coupled in series to the first electrode 31 via the first electric wire 35, and the other end of the first coil 34 is electrically coupled in series to the voltage application section 80 illustrated in FIGS. 1 and 2. In this embodiment, the first coil 34 is formed of a solenoid coil, and is arranged so that its length direction is along the Z direction. The shape, lengths, cross-sectional areas, number of turns, materials, and the like of the first coil 34 are selected, for example, in accordance with the driving frequency $f_0$ and so as to achieve impedance matching between the first heater 30 and the voltage application section 80. Although not shown, in this embodiment, one end of the second coil 44 is electrically coupled to the third electrode 41 via a second electric wire, and the other end is electrically coupled in series with the voltage application section 80. In another embodiment, one end of the first coil 34 may be coupled in series with the second electrode 32 instead of the first electrode 31. Similarly, one end of the second coil 44 may be coupled in series to the fourth electrode 42 instead of the third electrode 41.

When the voltage application section 80 applies an AC voltage to the first heater 30, a high voltage is generated at one end of the first coil 34. Accordingly, the intensity of the electric field generated from the first electrode 31 and the second electrode 32 can be increased. The first coil 34 is desirably disposed so that the distance between one end of the first coil 34 and the first electrode 31 is as small as possible. When the distance between the one end of the first coil 34 and the first electrode 31 is long, the high voltage generated at the one end of the first coil 34 may generate, between the first coil 34 and the first electrode 31 or between the first electric wire 35 and the second electrode 32, an electric field that does not contribute to heating of the medium Md and may reduce the effect of increasing the strength of the electric field generated by the first electrode 31 and the second electrode 32. On the other hand, by making the distance between one end of the first coil 34 and the first electrode 31 short, it is possible to suppress the generation of such an electric field that does not contribute to the heating of the medium Md, and therefore it is possible to effectively increase the intensity of the electric field generated from the first electrode 31 and the second electrode 32. Similarly, the second coil 44 can increase the strength of an electric field generated from the third electrode 41 and the fourth electrode 42. Note that in another embodiment, the first electrode 31 and the third electrode 41 may exhibit the same function as that of the coil by, for example, forming the first electrode 31 and the third electrode 41 in a meander shape.

Figure 4:
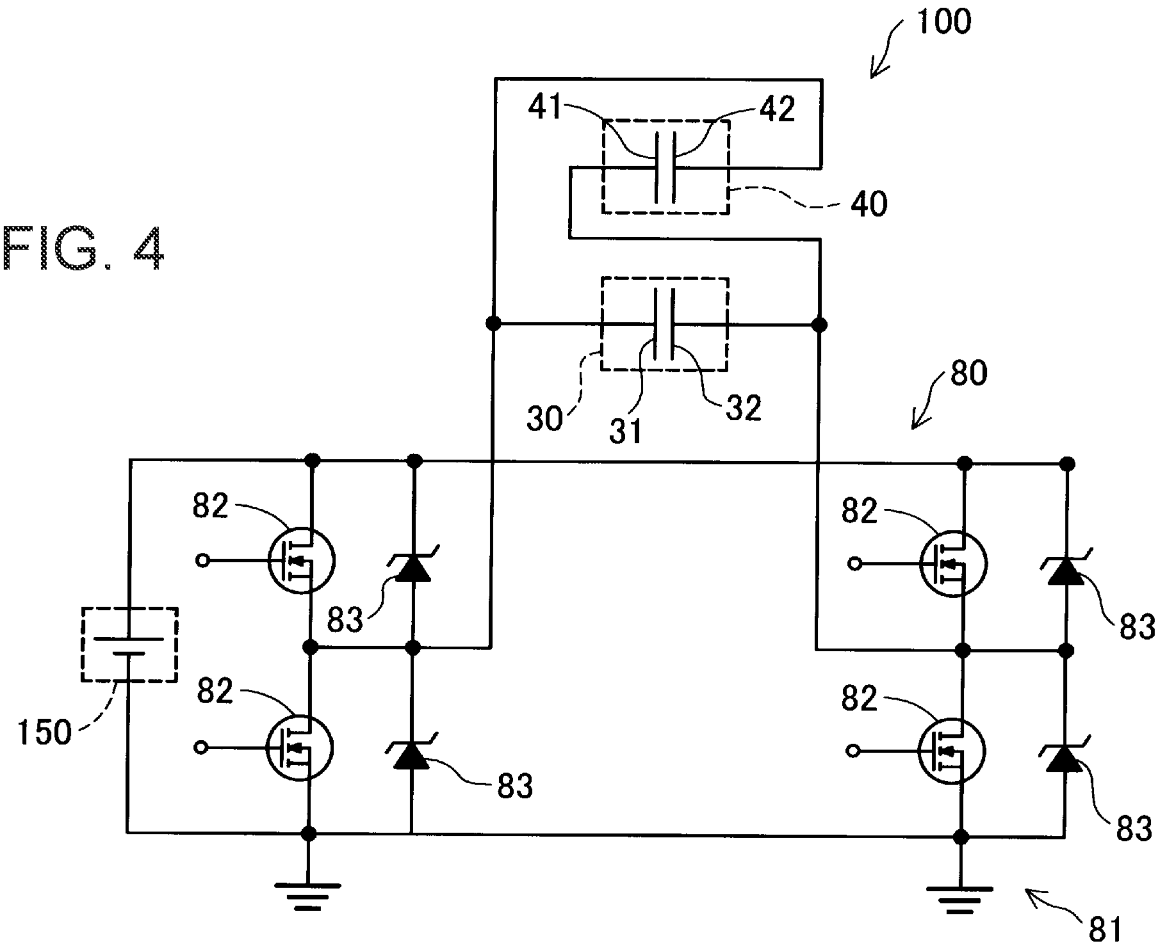
FIG. 4 is an explanatory diagram illustrating circuit configuration of the dielectric heating device.

FIG. 4 is an explanatory diagram illustrating circuit configuration of the dielectric heating device 100 according to the present embodiment. In FIG. 4, in order to facilitate understanding of the technology, a part of the circuit configuration of the dielectric heating device 100 is omitted. As shown in FIG. 4, the voltage application section 80 is configured as an inverter having a switching circuit 81. The switching circuit 81 is electrically coupled to a DC power supply 150, the first heater 30, and the second heater 40. The switching circuit 81 switches a DC voltage of the DC power supply 150 to convert the DC voltage into an AC voltage having a driving frequency $f_0$, and outputs the AC voltage to the first heater 30 and the second heater 40.

The switching circuit 81 in this embodiment is configured as a full-bridge type inverter, and includes four switching devices 82 and a Zener diode 83 for overvoltage protection provided corresponding to each switching device 82. In this embodiment, the switching devices 82 are configured by N-channel metal-oxide-semiconductor field-effect transistors (MOSFET). In other embodiments, the switching devices 82 may be composed of, for example, a bipolar transistor, an insulated gate transistor, a gate turn-off thyristor, or the like. The switching circuit 81 may include a PN junction diode or the like, in addition to or instead of the Zener diode 83. In addition, the switching circuit 81 may be configured as a phase shift full-bridge inverter, or may be configured as a half-bridge inverter.

Each switching device 82 repeatedly opens and closes a part of the switching circuit 81 in accordance with a control signal input to the gate of the switching device 82. The switching circuit 81 converts the DC voltage of the DC power supply 150 into an AC voltage at the driving frequency $f_0$ by the operation of the switching device 82. As a result, an AC voltage at the driving frequency $f_0$ is applied to the first heater 30 and the second heater 40.

In the present embodiment, AC voltages with phases inverted by 180° are applied to the first heater 30 and the second heater 40, respectively. More specifically, as shown in FIG. 4, the first electrode 31 of the first heater 30 and the fourth electrode 42 of the second heater 40 are coupled to the switching circuit 81 so as to be in the same phase with each other, and the second electrode 32 of the first heater 30 and the fourth electrode 42 of the second heater 40 are coupled to the switching circuit 81 so as to be in the same phase with each other, whereby AC voltages whose phases are inverted by 180° are applied to the first heater 30 and the second heater 40. In this way, by applying AC voltages whose phases are inverted by 180° from the adjacent heaters 20, it is possible to weaken radiation waves from the adjacent heaters 20 that do not contribute to heating of the medium Md.

Figure 5:
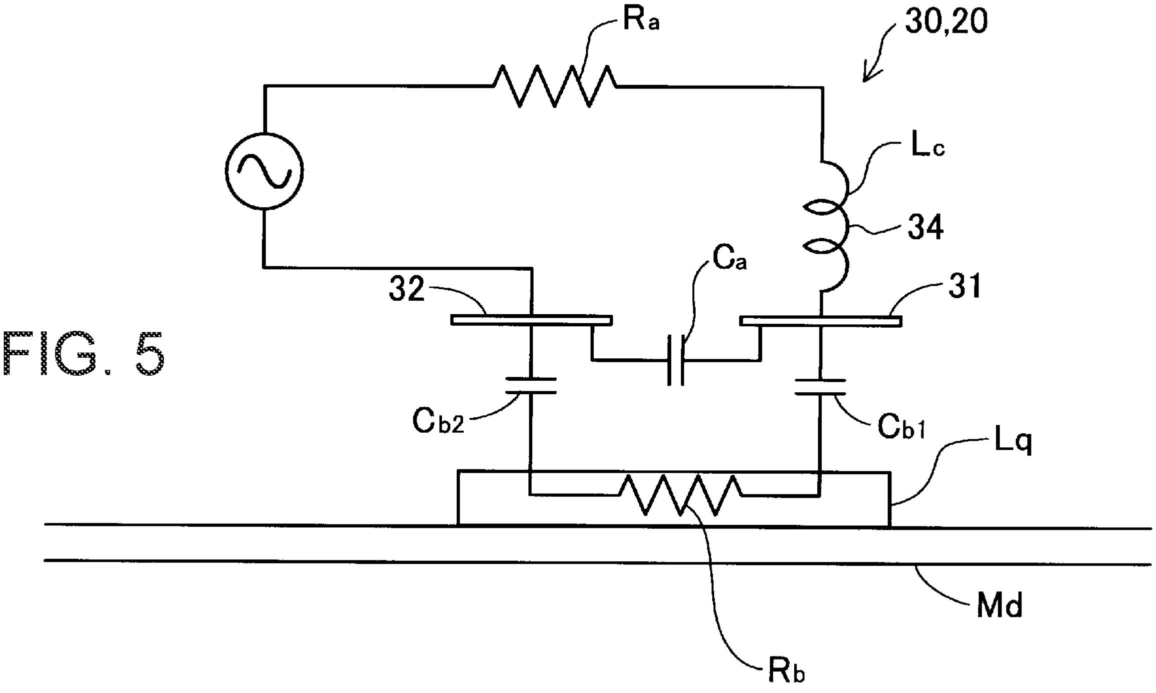
FIG. 5 is a schematic diagram illustrating a circuit formed by the heater and the liquid on the medium.
Figure 6:
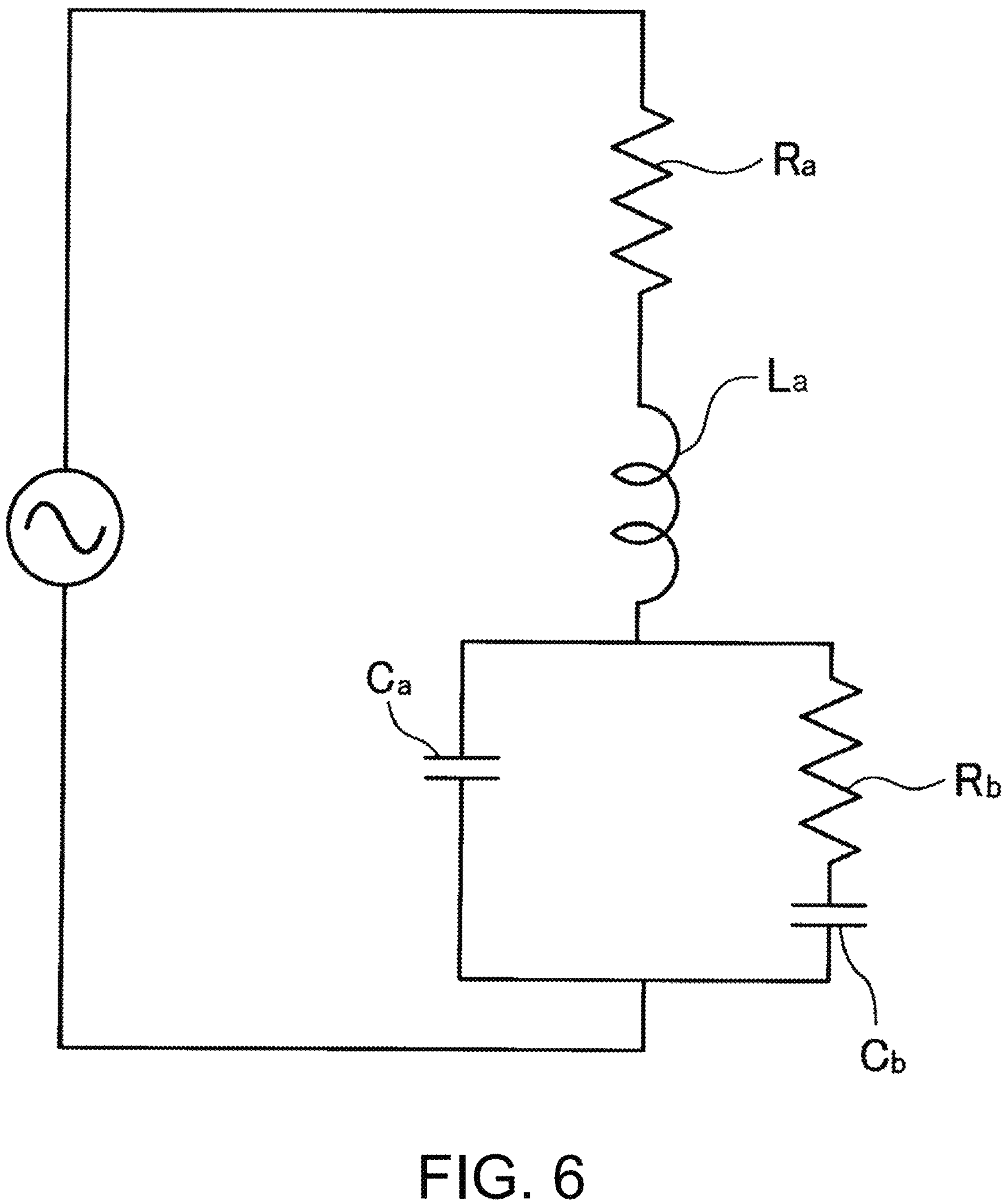
FIG. 6 is an equivalent circuit diagram of the dielectric heating device.

FIG. 5 is a schematic diagram for explaining a circuit in this embodiment formed by the heater 20 and the liquid Lq deposited on the medium Md. FIG. 6 is an equivalent circuit diagram of the dielectric heating device 100 according to the present embodiment. More specifically, FIG. 5 shows a circuit formed by the first heater 30 and the liquid Lq. Further, FIG. 6 corresponds to a circuit in the case of focusing on only the first heater 30 out of the first heater 30 and the second heater 40. In the circuit shown in FIGS. 5 and 6, each of the first electrode 31 and the second electrode 32 of the first heater 30 can be regarded as an conductive plate constituting one capacitor. Although not shown, a circuit similar to the circuit shown in FIG. 5 is also formed by the second heater 40 and the liquid Lq. Further, the circuit in the case of focusing on only the second heater 40 out of the first heater 30 and the second heater 40 is the same as the circuit shown in FIG. 6.

$R_a$ shown in FIGS. 5 and 6 represents the resistance of the first heater 30. The resistance $R_a$ includes an internal resistance of the voltage application section 80 and a parasitic resistance of the first coil 34. $L_a$ shown in FIG. 6 represents the inductance of the first heater 30. The inductance $L_a$ includes an inductance $L_c$ of the first coil 34 shown in FIG. 5 and parasitic inductances of the electrodes of the first heater 30. $C_a$ shown in FIGS. 5 and 6 represents the capacitance of the first heater 30. The capacitance $C_a$ includes the parasitic capacitance of the first coil 34 and the capacitance between the electrodes of the first heater 30. $R_b$ shown in FIGS. 5 and 6 represents the electric resistance of the liquid Lq deposited on the medium Md. $C_{b1}$ shown in FIG. 5 represents the parasitic capacitance between the first electrode 31 and the liquid Lq. $C_{b2}$ shown in FIG. 5 represents the parasitic capacitance between the second electrode 32 and the liquid Lq. $C_b$ shown in FIG. 6 is represented as the sum of parasitic capacitances $C_{b1}$ and $C_{b2}$. Further, the sum of the capacitance $C_a$ and the capacitance $C_b$ corresponds to the capacitance of the first heater 30.

As the liquid Lq on the medium Md is heated and drying proceeds, the water content of the medium Md decreases, and the capacitance $C_a$ of the first heater 30 and the resistance $R_b$ of the liquid Lq change. More specifically, the capacitance $C_a$ decreases because the capacitance of the capacitor configured by the first electrode 31 and the second electrode 32 decreases as the thickness of the water contained in the liquid Lq on the medium Md decreases due to the decrease in water content that accompanies the progress of drying. This is because the permittivity of water contained in the liquid Lq is higher than the permittivity of vacuum. In addition, since the mass fraction of water contained in the liquid Lq decreases due to a decrease in the water content accompanying the progress of drying, the conductivity of the liquid Lq decreases, and therefore the resistance $R_b$ increases. Although the capacitance $C_b$ actually decreases due to drying of the liquid Lq, the amount of decrease is very small compared to the amount of decrease in the capacitance $C_a$ and the amount of increase in the resistance $R_b$, and thus can be ignored.

The resonant frequency of the heater 20 when the liquid applied to the medium Md is dried is represented as the resonant frequency of the heater 20 in the equivalent circuit illustrated in FIGS. 5 and 6. Therefore, the resonant frequency of the heater 20 changes with the progress of drying. More specifically, as described above, since the capacitance $C_a$ decreases due to the decrease in the water content with the progress of drying, the resonant frequency of the heater 20 increases with the progress of drying. Hereinafter, such a change in the resonant frequency of the heater 20 with the progress of drying is also referred to as a shift in the resonant frequency. In addition, a change width of the resonant frequency due to the shift of the resonant frequency is also referred to as a shift amount of the resonant frequency. The resonance frequency of the first heater 30 when drying the liquid applied to the medium Md is also referred to as a first resonant frequency $f_1$. Similarly, the resonant frequency of the second heater 40 when drying the liquid applied to the medium Md is also referred to as a second resonant frequency $f_2$.

The first heater 30 is configured to satisfy a first condition, which is that the difference between the first resonant frequency $f_1$ and the driving frequency $f_0$ when the water content of the medium Md is in a first range is smaller than the difference between the first resonant frequency $f_1$ and the driving frequency $f_0$ when the water content is in a second range, which is smaller than the first range. When the water content of the medium Md is said to be in the first range or the second range, this refers to when the amount of water contained per unit volume of a first portion of the medium Md that forms the above-described equivalent circuit with the first heater 30 is in the first range or in the second range. The "amount of water" in this case is represented by the mass of water in the present embodiment, but in another embodiment may be represented by, for example, the volume of water or a ratio of the mass or volume of water to a reference value of the mass or volume. Hereinafter, "the water content of the first portion" refers to "the water content per unit volume of the first portion" unless otherwise specified. In the present embodiment, the first portion corresponds to a portion located between the first electrode 31 and the second electrode 32, inclusive, when viewed along the Z direction. The "portion between the first electrode 31 and the second electrode 32, inclusive" includes the portion where the first electrode 31 and the second electrode 32 are provided.

In the present embodiment, the second heater 40 is configured in the same manner as the first heater 30 so as to satisfy a third condition, which is that the difference between the second resonant frequency $f_2$ and the driving frequency $f_0$ when the water content of the medium Md is in the third range is smaller than a difference between the second resonant frequency $f_2$ and the driving frequency $f_0$ when the water content is in the fourth range, which is smaller than the third range. When the water content of the medium Md is said to be in the third range or the fourth range, this refers to when the amount of water contained per unit volume of a second portion of the medium Md that forms the above-described equivalent circuit with the second heater 40 is in the third range or in the fourth range. Hereinafter, "the water content of the second portion" refers to "the water content per unit volume of the second portion" unless otherwise specified. In the present embodiment, the second portion corresponds to a portion located between the third electrode 41 and the fourth electrode 42, inclusive, when viewed along the Z direction. The "portion between the third electrode 41 and the fourth electrode 42, inclusive" includes the portions where the third electrode 41 and the fourth electrode 42 are provided.

Figure 7:
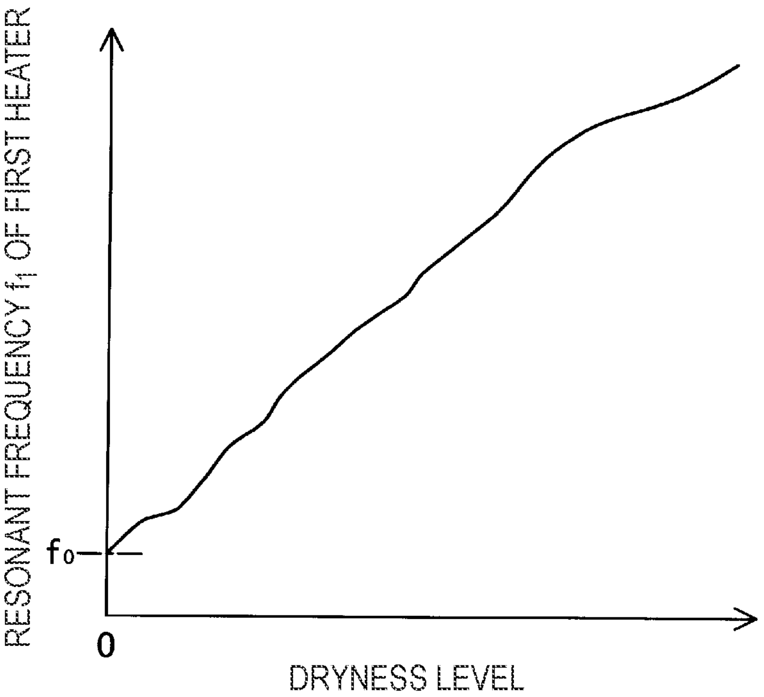
FIG. 7 is an explanatory diagram showing the relationship between dryness level and first resonant frequency.

FIG. 7 is an explanatory diagram showing the relationship between the dryness level and the first resonant frequency $f_1$. In FIG. 7, a schematic graph is shown in which the horizontal axis represents "the dryness level" and the vertical axis represents "the first resonant frequency $f_1$." The "dryness level" in FIG. 7 represents the difference between the current water content in the first portion of the medium Md and the water content in the first portion of the medium Md at the starting time point of drying. The water content at a certain starting time point of drying is calculated, for example, as the difference between the mass per unit volume of the first portion at the starting time point of drying and the dry mass representing the mass per unit volume of the first portion at the completion time of drying. The dry mass is calculated, for example, as a mass in a case where the medium Md is sufficiently dried. The first resonant frequency $f_1$ is calculated, for example, based on the inductance and capacitance of the first heater 30 measured using a network analyzer.

Since the dryness level in FIG. 7 has a negative correlation with the water content in the first portion, it can be said that FIG. 7 represents the relationship between the water content in the first portion and the first resonant frequency $f_1$. Since there is a correlation between the water content and the dryness level in this manner, the dryness level at each timing can also be determined by comparing them with the magnitudes of the water contents at two timings at which the degree of drying progress are different from each other, instead of directly comparing the magnitudes of the water content at the respective timings. Note that the "dryness level" may be represented by, for example, the ratio of the current water content in the first portion to the water content at the starting time point of drying, the reciprocal of the current water content in the first portion, or the drying time when the liquid applied to the first portion is dried under certain conditions.

In the present embodiment, the first heater 30 is configured such that the first resonant frequency $f_1$ and the driving frequency $f_0$ match when the water content in the first portion of the medium Md is a water content corresponding to a solid coating that corresponds to the water content when the medium Md is solid coated with a liquid. The case where the liquid is solidly coated on the medium Md refers to a state in which the liquid is applied to at least a partial area of one surface of the medium Md completely over that area. More specifically, the water content corresponding to a solid coating, in the present embodiment, is defined as the water content per unit volume in the first portion of the medium Md immediately after solid printing of a plurality of colors is performed on the medium Md by the liquid ejection section 210. Solid printing means that dots are formed in all pixels constituting an image, and printing is performed so that no background color portion of the medium Md remains. In FIG. 7, the dryness level is zero, that is, the amount of water at the starting time point of drying corresponds to the water content corresponding to a solid coating. Accordingly, in the present embodiment, when the water content in the first portion of the medium Md at the starting time of drying is equal to or less than the water content corresponding to a solid coating, then the difference between the first resonant frequency $f_1$ and the driving frequency $f_0$ increases as drying progresses, that is, as the water content in the first portion decreases. Note that "the first resonant frequency $f_1$ and the driving frequency $f_0$ match each other" does not mean that "the first resonant frequency $f_1$ and the driving frequency $f_0$ have to completely coincide with each other". More specifically, with respect to the first resonant frequency $f_1$ and the driving frequency $f_0$, it is sufficient that the ratio of the difference between the first resonant frequency $f_1$ and the driving frequency $f_0$ to the driving frequency $f_0$ match within a range of ±1.0%, more desirably within a range of ±0.5%, and even more desirably within a range of ±0.1%. In another embodiment, the water content corresponding to a solid coating may be defined as, for example, a water content per unit volume in the first portion of the medium Md immediately after solid printing of a single color such as black is performed on the medium Md by the liquid ejection section 210.

Figure 8:
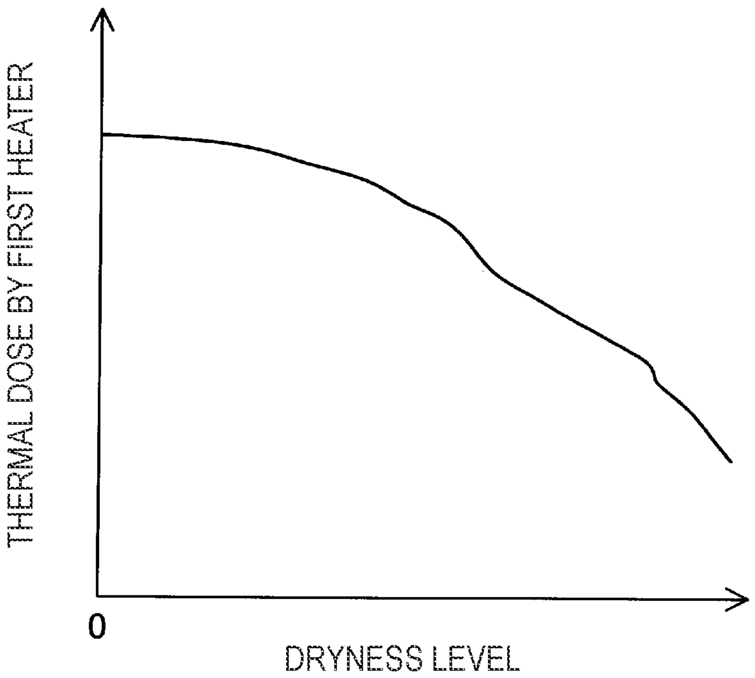
FIG. 8 is an explanatory diagram illustrating a relationship between dryness level and heat amount by a first heater.

FIG. 8 is an explanatory view showing the relationship between the dryness level and the heat amount by the first heater 30. In FIG. 8, a schematic graph is shown in which the horizontal axis represents the dryness level and the vertical axis represents the heat amount by the first heater 30. The first heater 30 is configured to satisfy a second condition, which is that a heat amount when the water content in the first portion is in a first range is larger than a heat amount when the water content in the first portion is in a second range. More specifically, in the present embodiment, as shown in FIG. 8, as drying progresses, that is, as the water content in the first portion decreases, the heat amount by the first heater 30 decreases. The heat amount applied by the first heater 30 when the moisture content is in the first range and the heat amount applied by the first heater 30 when the moisture content is in the second range can be compared by, for example, comparing temperatures when cotton cloths having moisture contents in the first range and in the second range are both heated from the same temperature at the same power output for the same duration of time. In the present embodiment, the second heater 40 is configured similarly to the first heater 30 so as to satisfy a fourth condition, which is that the heat amount when the water content in the second portion is in the third range is larger than the heat amount when the water content in the second portion is in the fourth range.

An increase in the shift amount of the first resonant frequency $f_1$ with the progress of drying contributes to a decrease in the heat amount by the first heater 30. The reason for this is that the impedance of the first heater 30 is further increased by increase in the difference between the first resonant frequency $f_1$ and the driving frequency $f_0$. On the other hand, the increase in the resistance $R_b$ of the liquid Lq on the medium Md due to the decrease in the water content accompanying the progress of drying, which has been described using FIGS. 5 and 6, contributes to an increase in the heat amount by the first heater 30. This is because the current flowing through the resistance components of the liquid Lq in the equivalent circuit decreases due to an increase in the resistance $R_b$, and thus the Q value in the equivalent circuit increases. In the present embodiment, the second condition is satisfied by configuring the first heater 30 such that the amount of decrease in the heat amount due to the shift of the first resonant frequency $f_1$ described above exceeds the amount of increase in the heat amount due to the increase in the resistance $R_b$ described above.

The shift amount of the first resonant frequency $f_1$ can be increased by increasing the ratio of the capacitance $C_b$ to the capacitance of the first heater 30 in the equivalent circuit shown in FIGS. 5 and 6. Increasing the ratio of the capacitance $C_b$ to the capacitance of the first heater 30 corresponds to increasing the influence of the dielectric constant of the liquid Lq on a near electric field formed in a near region between the first electrode 31 and the second electrode 32, and corresponds to increasing the ratio of electric lines of force passing through the liquid Lq when the near electric field is represented by the electric lines of force.

Figure 9:
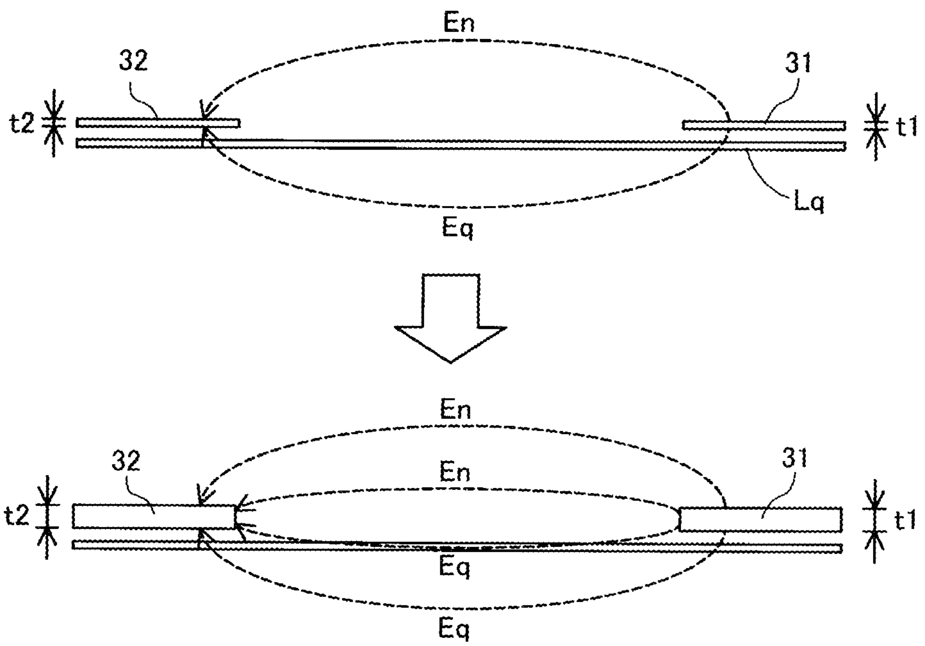
FIG. 9 is a schematic diagram illustrating adjustment of the thickness of the first electrode and the thickness of the second electrode.

FIG. 9 is a diagram for explaining adjustment of thickness t1 of the first electrode 31 and thickness t2 of the second electrode 32. For example, as shown in FIG. 9, by adjusting the thicknesses t1 and t2, the shift amount of the first resonant frequency $f_1$ can be adjusted. More specifically, in order to increase the shift amount of the first resonant frequency $f_1$, that is, in order to increase the ratio of the electric lines of force Eq passing through the liquid Lq, the thicknesses t1 and t2 are adjusted so that the number of the electric lines of force Eq relatively increases with respect to the number of the electric lines of force En not passing through the liquid Lq. FIG. 9 shows an example in which the ratio of the electric lines of force Eq is increased by increasing the thicknesses t1 and t2. In general, as shown in FIG. 9, the number of electric lines of force Eq can be increased by making the thickness t1 and the thickness t2 thicker. However, when the thickness t1 or the thickness t2 is too thick, the number of electric lines of force En increases and the ratio of the electric lines of force Eq may decrease. In this embodiment, the thickness t1 and the thickness t2 are desirably adjusted, for example, between 0.1 mm and 2.0 mm, inclusive.

Figure 10:
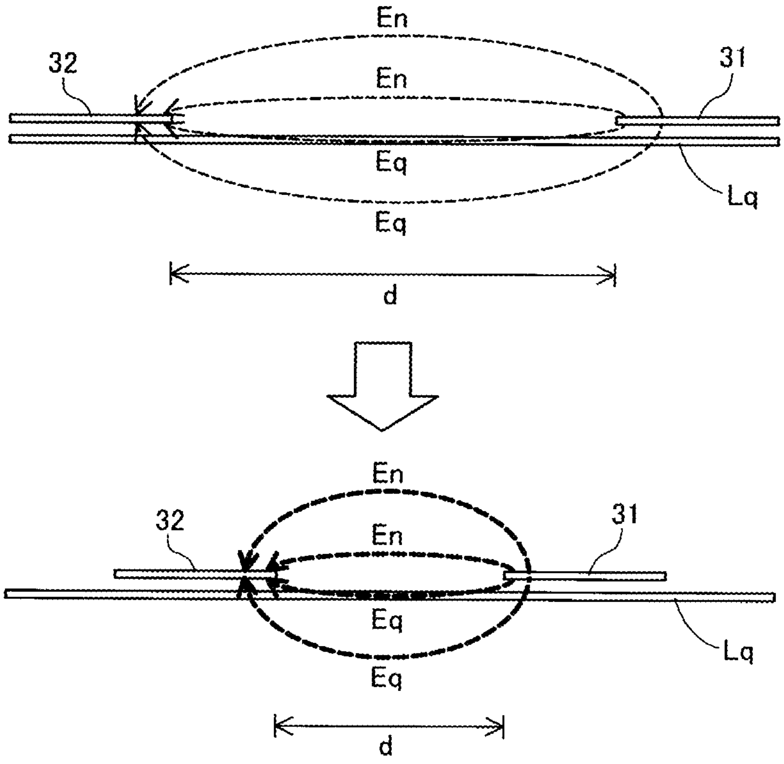
FIG. 10 is a schematic diagram illustrating adjustment of the distance between the first electrode and the second electrode.

FIG. 10 is a diagram for explaining the adjustment of the distance d between the first electrode 31 and the second electrode 32. Note that thicker broken-line arrows in FIG. 10 indicate that the number of electric lines of force is larger than that of thinner broken-line arrows. FIG. 10 shows an example in which the shift amount of the first resonant frequency $f_1$ is increased by shortening the distances d in a range in which the ratio of the electric lines of force Eq passing through the liquid Lq increases. As shown in FIG. 10, the shift amount of the first resonant frequency $f_1$ can also be adjusted by adjusting the distances d.

Figure 11:
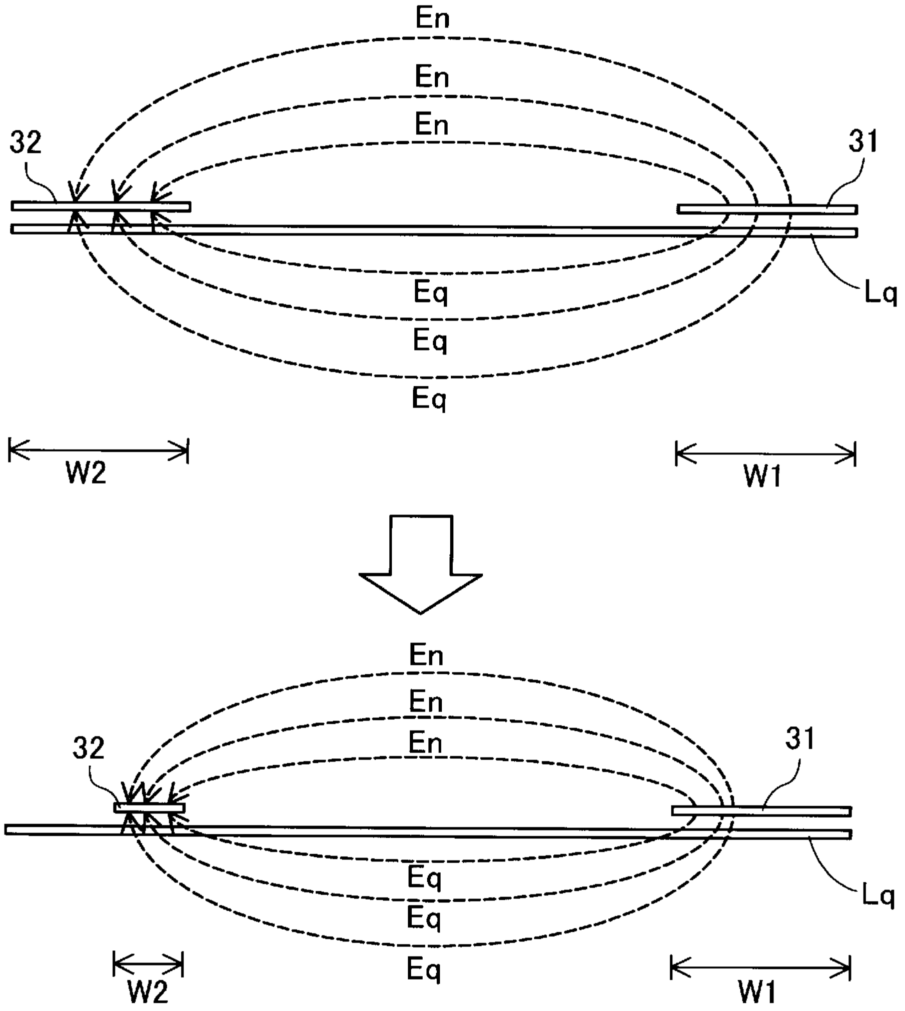
FIG. 11 is a schematic diagram for explaining the adjustment of the width of the first electrode and the width of the second electrode.

FIG. 11 is a diagram illustrating the adjustment of the width W1 of the first electrode 31 and the width W2 of the second electrode 32. As shown in FIG. 11, the shift amount of the first resonant frequency $f_1$ can also be adjusted by adjusting the width W1 and the width W2. In this case, by narrowing the width W1 and the width W2, the electric lines of force can be easily concentrated in the vicinity of the liquid Lq, so that the number of electric lines of force En can be increased, and the shift amount of the first resonant frequency $f_1$ can be increased. FIG. 11 shows an example in which the shift amount of the first resonant frequency $f_1$ is increased by narrowing the width W2.

Further, the amount of increase in the heat amount due to the increase in the resistance $R_b$ can be reduced by, for example, reducing the parasitic resistance of the first coil 34 while maintaining the inductance. The reason for this is that since the resistance $R_a$ in the equivalent circuit shown in FIGS. 5 and 6 becomes small, the Q value in the equivalent circuit becomes large, and the contribution of the resistance $R_b$ to the Q value in the equivalent circuit becomes relatively small. In this case, for example, by increasing the diameter of the winding of the first coil 34 or increasing the pitch between the winding of the first coil 34, the parasitic resistance of the first coil 34 can be reduced. As described above, by configuring the voltage application section 80 with the switching circuit 81, the internal resistance of the voltage application section 80 can be reduced as compared with the case where the voltage application section 80 is configured with an analog amplifier such as a class-B amplifier or a high-frequency power supply circuit having a transformer, so that the resistance $R_a$ of the equivalent circuit shown in FIGS. 5 and 6 can be reduced. This also makes it possible to reduce the amount of increase in the heat amount due to an increase in the resistance $R_b$.

In a case where the increased amount of the heat amount due to the increase in the resistance $R_b$ is reduced as described above, it is preferable that the first heater 30 is configured such that the heat amount of the liquid by the first heater 30 after completion of drying of the medium Md is equal to or less than the cooling amount of the liquid. The timing at which the drying of the medium Md is completed is determined, for example, as a timing at which the water content of the first portion of the medium Md becomes equal to or less than a predetermined water content. For example, when the blower is provided as described above, the cooling amount of the liquid is a cooling amount in which cooling by the blower is taken into account. Thus, overheating of the medium Md after completion of drying can be suppressed.

According to the dielectric heating device 100 in the first embodiment described above, the first heater 30 is configured such that a difference between a resonant frequency of the first heater 30 and the driving frequency $f_0$ when the water content of the medium Md is in a first range is smaller than the difference between the resonance frequency of the first heater and the driving frequency $f_0$ when the water content is in a second range, which is smaller than the first range, and a heat amount of the first heater 30 when the water content is in the first range is larger than a heat amount when the water content is in the second range. Accordingly, even if the output of the AC power applied to the first heater 30 is not controlled based on the water content of the medium Md, the medium Md can be heated by the first heater 30 with a larger heat amount when the water content is in the first range larger than the second range, and the medium Md can be heated by the first heater 30 with a smaller heat amount when the water content is in the second range, which is smaller than the first range. Therefore, it is possible to uniformly dry the liquid deposited on the medium Md without providing a sensor for measuring the water content of the medium Md.

In the present embodiment, the voltage application section 80 applies the AC voltage having the driving frequency $f_0$ to the third electrode and the fourth electrode 41, 42 of the second heater 40. The second heater 40 is configured such that the difference between the resonant frequency and the driving frequency $f_0$ of the second heater 40 when the water content of the medium Md is in the third range is smaller than the difference between the resonant frequency and the driving frequency $f_0$ of the second heater 40 when the water content is in the fourth range smaller than the third range, and such that the heating amount of the second heater 40 when the water content is in the third range is larger than the heat amount when the water content is in the fourth range. Thus, similarly to the first heater 30, even when the output of the AC power applied to the second heater 40 is not controlled based on the water content of the medium Md, the second heater 40 can heat the medium Md with a larger heat amount when the water content is in the third range larger than the fourth range, and can heat the medium Md with a smaller heat amount when the water content is in the fourth range, which is smaller than the third range. Therefore, in the configuration in which the first heater 30 and the second heater 40 are provided, it is possible to uniformly dry the liquid attached to the medium Md without individually controlling the output of the electric power applied to the first heater 30 and the output of the electric power applied to the second heater 40.

Further, in the present embodiment, the first heater and the second heater 30, 40 are arranged orthogonal to the Z direction as the first direction and arranged side by side along a third direction with intersecting the Y direction as the second direction. Therefore, variations in the dryness level in the third direction of the medium Md can be suppressed.

In addition, in the present embodiment, the voltage application section 80 includes the switching circuit 81 that switches a DC voltage of the DC power supply 150 to convert the DC voltage into an AC voltage having the driving frequency $f_0$. This makes that the internal resistance of the voltage application section 80 can be reduced as compared with the case where the voltage application section 80 is configured with an analog amplifier or a high-frequency power supply circuit having a transformer, and thus increases the possibility of improving power efficiency. In addition, since it is possible to reduce the amount of increase in the heat amount due to an increase in the resistance $R_b$ of the liquid attached to the medium Md with the progress of drying, it is possible to further increase the heat amount when the water content is in the first range with respect to the heat amount when the water content is in the second range.

In addition, in the present embodiment, the first heater 30 is configured such that the first resonant frequency $f_1$ and the driving frequency $f_0$ match when the water content corresponding to a solid coating is equal to the water content. According to this, when the liquid on the medium Md having a water content, equal to or less than the water content corresponding to a solid coating, is dried by the first heater 30, the difference between the first resonant frequency $f_1$ and the driving frequency $f_0$ can be increased as the drying progresses. Therefore, variations in the dryness level of the medium Md can be further suppressed.

B. Other Embodiments (B-1) In the above embodiment, the dielectric heating device 100 includes the first heater 30 and the second heater 40. In contrast, the dielectric heating device 100, for example, may include only the first heater 30. Further, the dielectric heating device 100 may include, for example, one or more other heaters 20 in addition to the first heater 30 and the second heater 40.

(B-2) In the above embodiment, the first heater 30 and the second heater 40 are applied with the AC voltage having the driving frequency $f_0$ by the single voltage application section 80. On the other hand, for example, two separately configured voltage application sections 80 may apply AC voltages at the driving frequency $f_0$, one applying to the first heater 30 and the other applying to the second heater 40.

(B-3) In the embodiment described above, the voltage application section 80 is configured as an inverter including the switching circuit 81 that switches the DC voltage of the DC power supply 150 to convert the DC voltage into the AC voltage having the driving frequency $f_0$. On the other hand, the voltage application sections 80 may not include the switching circuit 81, and may be configured by high-frequency power supply circuits including analog amplifiers and transformers, for example.

(B-4) In the above-described embodiment, the first heater 30 is configured such that the first resonant frequency $f_1$ and the driving frequency $f_0$ match each other when the water content corresponds to the water content equal to the water content corresponding to a solid coating. In contrast, as long as the first heater 30 is configured to satisfy the first condition and the second condition, the first heater 30 may not be configured such that the first resonant frequency $f_1$ and the driving frequency $f_0$ match when the water content is equal to the water content corresponding to a solid coating. For example, the first heater 30 may be configured such that the first resonant frequency $f_1$ and the driving frequency $f_0$ match with each other when the water content corresponds to a water content lower than the water content corresponding to a solid coating. Similarly, as long as the second heater 40 is configured to satisfy the third condition and the fourth condition, the second heater 40 may not be configured such that the second resonant frequency $f_2$ and the driving frequency $f_0$ match when the water content is the water content corresponding to a solid coating.

(B-5) In the above embodiment, the second electrode 32 is disposed so as to surround the first electrode 31 when viewed along the Z direction. In contrast, for example, the first electrode 31 and the second electrode 32 may be disposed so as to be adjacent to each other when viewed along the Z direction, or may be disposed so as to sandwich the medium Md by the first electrode 31 and the second electrode 32 in the Z direction. In this case, the shapes of the first electrode 31 and the second electrode 32 may be arbitrary, and may be circular, oblong, rectangular, polygonal or the like. When viewed along the Z direction, the area of the first electrode 31 and the second electrode 32 may be the same as or different from each other. The first electrode 31 and the second electrode 32 are desirably arranged so as not to overlap each other when viewed along the Z direction. Similarly, the third electrode 41 and the fourth electrode 42 may be arranged to be adjacent to each other when viewed along the Z direction, or may be arranged to sandwich the medium Md by the third electrode 41 and the fourth electrode 42 in the Z direction, for example.

(B-6) In the embodiment described above, the medium Md is continuously transported from the liquid ejection apparatus 205 to the dielectric heating device 100. When the medium Md is continuously transported from the liquid ejection apparatus 205 to the dielectric heating device 100 as described above, the transport section 320 may include, for example, only a transport unit common to the dielectric heating device 100 and the liquid ejection apparatus 205. In addition, the medium Md may not be continuously transported from the liquid ejection apparatus 205 to the dielectric heating device 100. For example, after the medium Md to which the liquid is applied by the liquid ejection apparatus 205 is once wound in a roll shape, the medium Md may be moved to the dielectric heating device 100 by a robot or the like. In this case, in the dielectric heating device 100, for example, it is possible to heat the medium Md while transporting the medium Md by the second transport section 322 or the like while unwinding the medium Md wound in a roll shape.

(B-7) In the above embodiment, the heater 20 may be configured to be capable of reciprocating in the third direction. For example, the heater 20 may be supported by a driving unit (not shown) including a belt mechanism or a ball screw mechanism, and may be reciprocated in the X direction.

(B-8) In the above embodiment, a frequency of 13.56 MHz is used as the driving frequency $f_0$. In contrast, the frequency of 13.56 MHz may not be used as the driving frequency $f_0$, and for example, frequencies of 40.68 MHz, 2.45 GHz, 5.8 GHz, and the like, which are other ISM bands, may be used. The driving frequency $f_0$ may not be high frequency as long as the liquid deposited on the medium Md can be heated by the heater 20. In this case, the driving frequency $f_0$ are desirably 100 kHz or more and less than 1 MHz, for example.

(B-9) In the above embodiment, the dielectric heating device 100 is integrated into the liquid ejection system 200. On the other hand, the dielectric heating device 100 may not be integrated in the liquid ejection system 200, and for example, only the dielectric heating device 100 may be used alone.

C. Other Forms

The present disclosure is not limited to the embodiments described above, but can be realized in various forms without departing from the scope of the present disclosure. For example, the present disclosure can also be realized by the following aspects. The technical features in the above embodiments that correspond to the technical features in each aspect described below can be replaced or combined as appropriate to solve some or all of the issues of this disclosure or to achieve some or all of the effects of this disclosure. In addition, if a technical feature is not described as an essential feature in the present specification, the technical feature can be deleted as appropriate.

(1) According to a first aspect of the present disclosure, a dielectric heating device is provided. This dielectric heating device includes a first heater, configured to heat and dry the liquid, having a first electrode and a second electrode facing a medium on which is deposited a liquid containing water, and a first coil electrically coupled in series with the first electrode, and a voltage application section that applies an AC voltage having a predetermined driving frequency to the first electrode and to the second electrode. The first heater is configured such that a difference between a resonant frequency of the first heater and the driving frequency when the water content of the medium is in a first range is smaller than the difference between the resonant frequency of the first heater and the driving frequency when the water content is in a second range smaller than the first range, and a heat amount, when the water content is in the first range, is larger than a heat amount, when the water content is in the second range.

According to this aspect, even if the output of the AC power applied to the first heater is not controlled based on the water content of the medium, the medium can be heated by the first heater with a larger heating amount when the water content is in the first range larger than the second range, and the medium can be heated by the first heater with a smaller heat amount when the water content is in the second range smaller than the first range. Therefore, the liquid deposited on the medium can be uniformly dried without providing a sensor that measures the water content of the medium.

(2) In the aspect described above, the dielectric heating device further includes a second heater configured to heat and dry the liquid, having a third electrode and a fourth electrode that face the medium and a second coil electrically coupled in series with the third electrode, wherein the voltage application section may apply an AC voltage of the driving frequency to the third electrode and to the fourth electrode and the second heater is configured such that a difference between a resonant frequency of the second heater and the driving frequency when the water content of the medium is in a third range is smaller than a difference between the resonant frequency of the second heater and the driving frequency when the water content is in a fourth range, which is smaller than the third range and a heat amount when the water content is in the third range is larger than a heat amount when the water content is in the fourth range. According to this aspect, in the configuration in which the first heater and the second heater are provided, the liquid attached to the medium can be uniformly dried without individually controlling the output of the electric power applied to the first heater and the output of the electric power applied to the second heater.

(3) In the aspect described above, the first electrode, the second electrode, the third electrode, and the fourth electrode face the medium, which is transported in a first direction, in a second direction orthogonal to the first direction and the first heater and the second heater may be aligned along a third direction that is orthogonal to the first direction and that intersects the second direction. According to this aspect, it is possible to suppress variations in the dryness level of the liquid on the medium in the third direction.

(4) In the aspect described above, the voltage application section may include a switching circuit that switches a DC voltage of a DC power supply to convert the DC voltage into an AC voltage having the driving frequency. According to this aspect, compared to a case where the voltage application section is configured by, for example, a high-frequency power supply circuit including an analog amplifier and a transformer, a possibility that the voltage application section can be miniaturized and a possibility that power efficiency can be improved are increased.

(5) In the aspect described above, the first heater may be configured such that the driving frequency and the resonant frequency of the first heater match each other when the water content corresponds to a water content corresponding to when liquid is solidly coated on the medium. According to this aspect, in a case where the liquid on the medium whose water content is equal to or less than the water content corresponding to a solid coating to medium is dried by the first heater, it is possible to increase the difference between the resonant frequency and the driving frequency of the first heater as the drying progresses. Therefore, variations in the dryness level of the liquid on the medium can be further suppressed.

(6) According to a second aspect of the present disclosure, a liquid ejection system is provided. A liquid ejection system includes the dielectric heating device according to the aspect described above, and a liquid ejection section configured to eject and apply the liquid to the medium, wherein the first heater heats the medium to which the liquid has been applied by the liquid ejection section.

(7) According to a third aspect of the present disclosure, a liquid ejection apparatus includes a first electrode and a second electrode face a medium on which water-containing liquid is attached, and to which an AC voltage having a predetermined driving frequency is applied, and a first coil that is electrically coupled in series with the first electrode. The liquid ejection apparatus ejects liquid heated by the heater on the medium, wherein the heater is configured such that a difference between the resonant frequency of the heater and the driving frequency when the water content of the medium is in a first range is smaller than the difference between the resonant frequency of the heater and the driving frequency when the water content is in a second range smaller than the first range, and a heat amount, when the water content is in the first range, is larger than a heat amount, when the water content is in the second range. The liquid ejection apparatus includes a transport section for transporting the medium, a liquid ejection section for ejecting and applying the liquid to the medium, and a control section for controlling the transport section and the liquid ejection section.

What is claimed is:

1. A dielectric heating device comprising:

a first heater that is configured to heat and dry a liquid and that includes
- a first electrode and a second electrode that face a medium on which is deposited the liquid containing water and
- a first coil electrically coupled in series with the first electrode and a voltage application section that applies an AC voltage having a predetermined driving frequency to the first electrode and to the second electrode, wherein the first heater is configured such that a difference between the driving frequency and a resonant frequency of the first heater when the water content of the medium is in a first range is smaller than a difference between the driving frequency and the resonant frequency of the first heater when the water content is in a second range, which is smaller than the first range, and a heat amount when the water content is in the first range is larger than a heat amount when the water content is in the second range.

2. The dielectric heating device, according to claim 1, further comprising:

a second heater configured to heat and dry the liquid, including
- a third electrode and a fourth electrode that face the medium and a second coil electrically coupled in series with the third electrode, wherein the voltage application section applies an AC voltage of the driving frequency to the third electrode and to the fourth electrode and the second heater is configured such that a difference between a resonant frequency of the second heater and the driving frequency when the water content of the medium is in a third range is smaller than a difference between the resonant frequency of the second heater and the driving frequency when the water content is in a fourth range, which is smaller than the third range and a heat amount when the water content is in the third range is larger than a heat amount when the water content is in the fourth range.

3. The dielectric heating device, according to claim 2, wherein the first electrode, the second electrode, the third electrode, and the fourth electrode face the medium, which is transported in a first direction, in a second direction orthogonal to the first direction and the first heater and the second heater are aligned along a third direction that is orthogonal to the first direction and that intersects the second direction.

4. The dielectric heating device according to claim 1, wherein the voltage application section includes a switching circuit that switches a DC voltage of a DC power supply to convert the DC voltage into an AC voltage having the driving frequency.

5. The dielectric heating device, according to claim 1, wherein the first heater is configured such that the driving frequency and the resonant frequency of the first heater match each other when the water content corresponds to a water content corresponding to when liquid is solidly coated on the medium.

6. A liquid ejection system comprising:

the dielectric heating device according to claim 1 and a liquid ejection section configured to eject and apply the liquid to the medium, wherein the first heater heats the medium to which the liquid has been applied by the liquid ejection section.

* * * * *